United States Patent

[11] 3,572,837

[72] Inventor Joseph A. Lackey
 2718-D Blake Road, Portage, Ind. 46368
[21] Appl. No. 791,001
[22] Filed Jan. 14, 1969
[45] Patented Mar. 30, 1971

[54] TRUCK TAILGATE OPERATING MECHANISM
 8 Claims, 5 Drawing Figs.
[52] U.S. Cl. ............................................. 298/23
[51] Int. Cl. ............................................. B60p 1/26
[50] Field of Search ............................................. 298/23

[56] References Cited
UNITED STATES PATENTS
2,261,745  11/1941  Sand ............................ 298/23(C)
3,072,438  1/1963  Livingston ...................... 298/23(C)
3,404,918  10/1968  Lackey ........................... 298/23(ML)
3,437,376  4/1969  Keathly .......................... 298/23(C)

Primary Examiner—Richard J. Johnson
Attorneys—Hobbs and Green and Kemon, Palmer & Estabrook ABSTRACT: A tailgate operating mechanism for a truck having a dump bed pivoted near the rear end and a tailgate pivoted near the top of the bed, including a means having a cam section and a cam driven section operable by the raising and lowering of the dump bed. The cam section is normally connected to the frame of the vehicle and the section operated by the cam is normally mounted on the underside of the bed near the front thereof where it will contact the cam section when the bed approaches its lowered position.

TRUCK TAILGATE OPERATING MECHANISM

In the operation of a dump truck to discharge the load, the operator manually releases the tailgate, generally by the use of a lever mounted near the forward end of the bed and connected to the tailgate latch by a mechanical linkage, and the front end of the bed is then raised by a hydraulic operating mechanism causing the load to slide from the rear of the bed. After the tailgate has been released and the load discharged, the bed is lowered to its original position and the tailgate manually latched in its closed position. In the dumping operations, the tailgate is normally released by the manually operated lever before the bed is raised or fully raised for discharging the load; however, the bed may be fully raised before the tailgate is released. In either of these two operations, the driver is required to leave the cab, or to reach therefrom and grasp and operate the manual lever to unlatch the tailgate. This is not only inconvenient and time consuming, but also often requires the use of substantial physical force to operate the lever, particularly after the front end of the bed has been elevated. It is therefore one of the principal objects of the invention to provide a reliable operating mechanism for the tailgate of dump trucks, which utilizes the movement of the truck bed between its raised and lowered positions for operation of the mechanism, and which automatically operates to relatch the tailgate when the bed is lowered.

Another object of the invention is to provide a versatile tailgate operating mechanism for dump trucks, which can be readily adapted to beds of various types and designs, and which can easily be installed at different locations on the truck bed without changing the basic design and construction of the mechanism or without changing the bed construction in any appreciable manner.

Still another object of the invention is to provide a reliable and relatively simple tailgate operating mechanism of the aforementioned type which can be operated automatically in conjunction with the operation of the bed or which can be operated manually when the bed is stationary to either release or latch the tailgate.

Further objects and advantages of the invention will become apparent from the following description and accompanying drawings, wherein.

Figure 1:
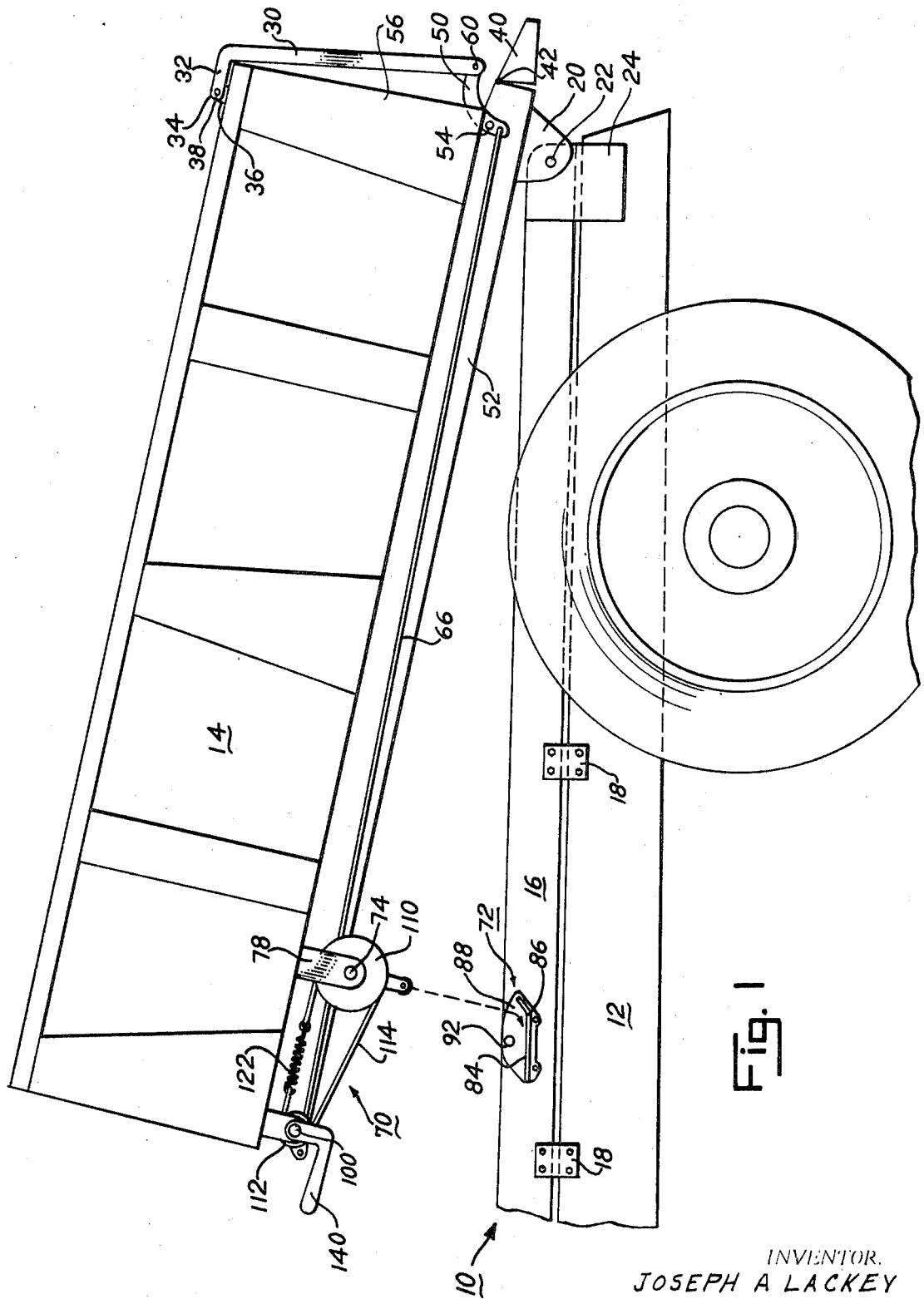
FIG. 1 is a fragmentary side elevational view of a dump truck showing the bed thereof in a partially elevated position.

Referring more specifically to the drawings and to FIG. 1 in particular, numeral 10 designates generally a dump truck having a frame 12, a bed 14 mounted on the frame by a subframe 16, the subframe being rigidly joined to the main frame 12 by a plurality of fixtures 18 welded to the side members of the two frames. The bed is pivoted to the subframe by a pivot means consisting of laterally disposed members 20 on the bed pivotally joined to the subframe by a pivot rod 22 extending through the rear end of the two side members of the subframe and through fixtures 24 on the opposite sides of the frame, the fixtures being joined to the main frame and subframe by welding or other suitable securing means. The bed has a tailgate 30 pivotally attached to the upper edge of the bed by a forwardly extending lever 32 and pivot means 34 consisting of upwardly extending fixtures 36 on opposite sides of the bed and corresponding pin 38 extending through lever 32 and fixture 36 on each side of the bed. The bottom of the bed extends rearwardly and terminates in a lip 40 pivotally connected to the main part of the bottom by a pivoted joint 42. The tailgate is latched at the bottom by a latch mechanism consisting of a hook 50 pivotally connected to the frame 52 of bed 14 by a pivot pin 54 extending through the frame members and outwardly to the edge of the bed where it supports and operates the hook. The hook is shown in its raised position with the tailgate unlatched. When the bed is lowered, the tailgate swings inwardly to the rear edges 56 of the bed and hook rotates downwardly over a pin 60 secured to the lower outer edge of the tailgate, thus latching the gate in its closed position.

The operating mechanism consists essentially of two basic parts, an operating force transmitting section 70 and an operating cam section 72. The force transmitting section is mounted on the underside of bed 14 near the forward end thereof, and the operating cam section is mounted on subframe 16 beneath the force transmitting section. The two sections are interconnected when the bed is in its lowered or substantially lowered position, and it is this interengagement which operates the mechanism to latch and unlatch the tailgate.

Figure 4:
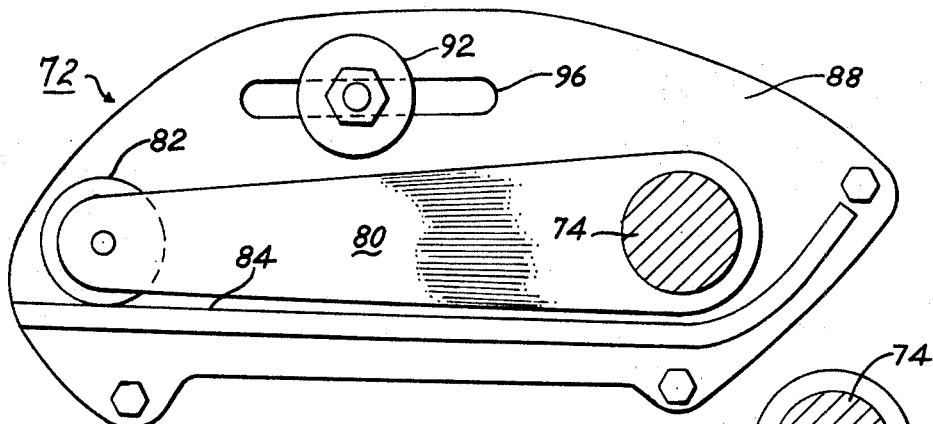
FIG. 4 is an elevational and partial cross-sectional view of the operating mechanism shown in FIG. 3, the section being taken on line 4–4 of FIG. 3.
Figure 5:
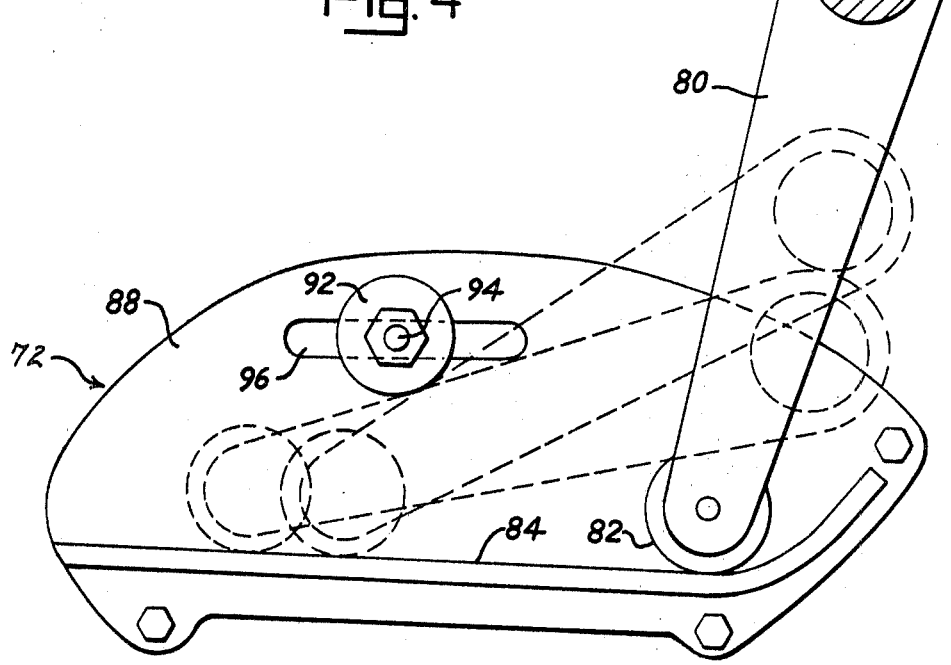
FIG. 5 is an elevational and cross-sectional view similar to that shown in FIG. 4 illustrating the mechanism in a different operating position.

Section 70 includes a shaft 74 journaled in fixtures 76 and 78, which in turn are rigidly mounted on the underside of bed 14. Mounted on the inner end of shaft 74 is a cam follower 80 having a roller 82 rotatably mounted in the bifurcated free end of the arm. The arm is rigidly secured to shaft 74 and roller 82 engages the cam surface 84 of operating cam section 72. The cam surface is provided on the upper surface of arcuate member 86, which in turn is supported by a flange 88, and forms a rigid track on which roller 82 travels as the bed is moved toward and away from the cam section. The cam section is secured by a plurality of bolts (not shown) to the side of subframe 16. In order to assure that the cam section follows the cam as the bed is raised, a roller 92 is secured to flange 88 above the surface 84 and is firmly attached to the cam section by a stub shaft 94 on which the roller is journaled. As the bed is lowered, roller 82 engages cam surface 84 and follows the surface from the right-hand end thereof, as viewed in FIGS. 4 and 5, to the left-hand end, as shown in FIG. 4, and, as the bed is raised, roller 92 causes lever 80 to return to its downwardly extending position illustrated in FIG. 5. Arm 80 is also urged in the direction opposite that produced by cam surface 84 by a coil spring 97 connected at one end to support member 76 and at the other end to a collar 98 secured to shaft 74 by a set screw 99. The stub shaft on which roller 92 is mounted is adjustable along flange 88 as a result of longitudinal slot 96 through which the shaft extends.

Figure 2:
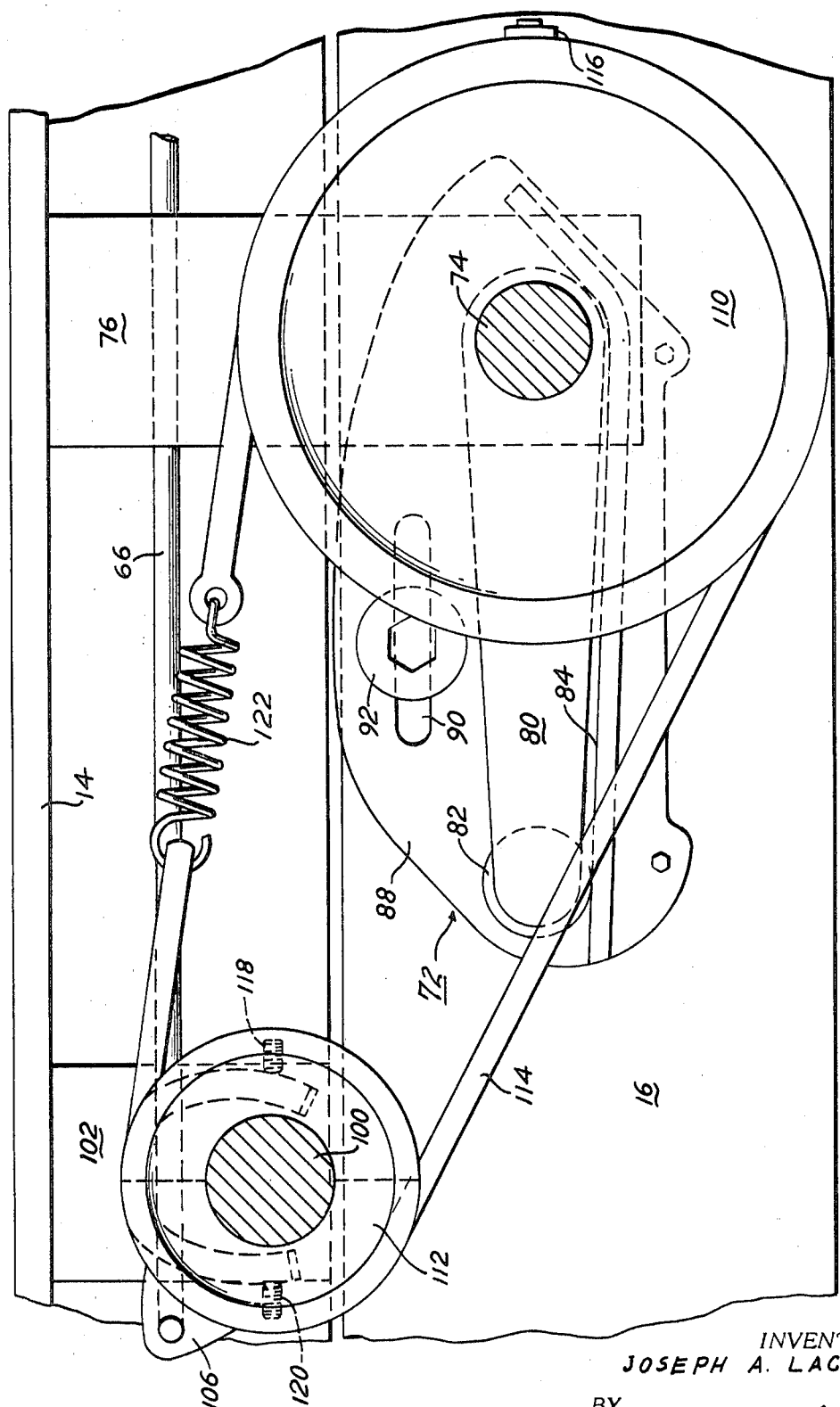
FIG. 2 is an enlarged partial cross-sectional and side elevational view of the operating mechanism for the tailgate of the dump truck bed, the section being taken on line 2–2 of FIG. 3.
Figure 3:
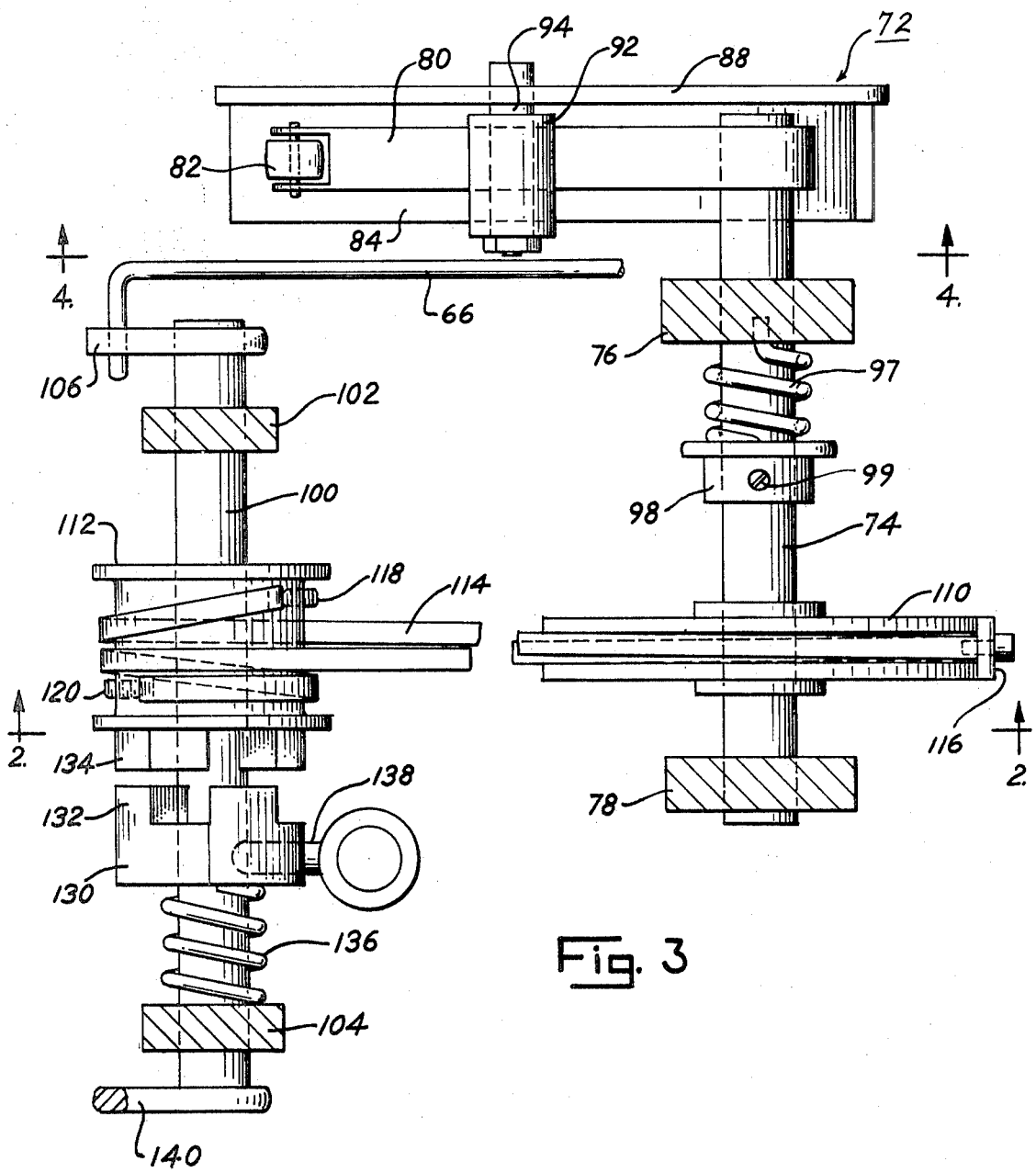
FIG. 3 is a top plan view of the tailgate operating mechanism shown in FIG. 2.

Mounted parallel with shaft 74 is a shaft 100 supported by fixtures 102 and 104 which are secured rigidly to the underside of bed 14. The inner end of shaft 100 is connected to hook 50 of the tailgate latch by rod 66 through a bell crank 106 rigidly secured to the end of shaft 100. Rotation of the shaft in a counterclockwise direction, as viewed in FIG. 1, shifts rod 66 rearwardly to release the tailgate. A pulley 110 is mounted on and secured to shaft 74, and a pulley 112 is mounted on shaft 100, and these two pulleys are interconnected by a cable 114 which extends around pulley 110 and is secured thereto by a clamp 116, and extends around pulley 112, and the end thereof is secured to the pulley by set screws 118 and 120. A section of cable 114 secured to pulley 112 by set screw 120 is connected to a safety spring 122 which in turn is connected to the other end of cable 114. Spring 122 is inserted in the cable between the pulleys on the upper side thereof, to prevent damage to the mechanism in the event the tailgate is not properly seated or is prevented from closing by a foreign object, when the bed is fully lowered and lever 80 has been moved to the position shown in FIG. 2. The spring also retains the cable in a taut condition during normal operation.

Pulley 112 is operatively connected to shaft 100 by a clutch mechanism consisting of an axially movable collar 130 having teeth 132 thereon for engagement with teeth 134 on the adjacent side of pulley 112. The clutch portion 132 is urged into engagement with the clutch portion formed by teeth 134 by a coil spring 136 reacting between support member 104 and collar 130. The collar may be held in either its engaged or disengaged position by a set screw 138, extending through the collar and engaging the shaft. The shaft 100 may be rotated manually by hand lever 140 to move lever 106 angularly in the direction to either release or latch the tailgate after clutch collar 130 has been withdrawn from clutch teeth 134. When the clutch elements consisting of teeth 132 and 134 are engaged, the mechanism operates automatically in both directions as the cam and cam lever operate to release and latch the tailgate as the bed is raised from its fully downward position to a partially elevated position.

In the operation of the present tailgate operating mechanism, starting with the bed in its lowered position and the tailgate held in its latched position with hook 50 extending downwardly and rearwardly over pin 60, the bed elevating mechanism is operated to tilt the bed upwardly in the manner illustrated in FIG. 1. As the bed moves upwardly from its fully lowered position, cam roller 82 moves along cam surface 84 in the direction to rotate lever 80 in a counterclockwise direction, as viewed in FIGS. 4 and 5, thus causing rotation of shaft 74, this movement being assured by roller 92 and spring 97. As shaft 74 is rotated, it rotates pulley 110 which, through cable 114, in turn rotates pulley 112. With clutch elements 132 and 134 engaged, shaft 100 in turn moves lever 106 angularly to shift rod 66 rearwardly, thus raising hook 50 and releasing the tailgate. As the bed is tilted further upwardly, the tailgate is free to swing outwardly, permitting the load to discharge from the bed. Upon return of the bed to its lowered position, roller 82 on lever 80 engages cam surface 84 which causes the lever to move in a clockwise direction as viewed in FIGS. 4 and 5, thus rotating shaft 74, and pulleys 110 and 112 in the clockwise direction. The rotation of pulley 112 is transmitted through clutch elements 132 and 134 to shaft 100, which in turn moves lever 106 angularly in the direction to shift rod 66 to the left, as viewed in FIG. 1, thereby causing hook 50 to move downwardly over pin 60 on the closed tailgate 30. The connection from arm 80 through shaft 74, pulleys 110 and 112, collar 130 and shaft 100 is a positive connection, with the exception of spring 122, and, since shaft 100 is connected to hook 50 by a direct mechanical linkage consisting of lever 106 and rod 66, the hook is positively held in its latched position, when the cam arm 80 is in the position on cam surface 84, of member 86, as illustrated in FIG. 4. Safety spring 122 will operate to relieve any excess forces in the event the tailgate fails to seat.

While only one embodiment of the present truck tailgate operating mechanism has been described in detail herein, various changes and modifications may be made without departing from the scope of the invention.

I claim:

1. A tailgate operating mechanism for a truck having a frame and a bed pivotally connected to the frame at the rear end thereof and a tailgate pivotally connected at the top to the rear of the bed, said mechanism comprising a latch for releasably retaining the tailgate in closed position, a latch operating means having a section with a cam and a section with a cam engaging means, one of said sections being connected to the frame and the other of said sections being mounted on the bed, said last mentioned section including two spaced parallel shafts with the cam engaging means being connected to one of said shafts and a linkage connected to the other of said shafts and to said latch for releasing and locking the tailgate as the bed is raised from and lowered to its lowered position, and a force transmission means interconnecting said shafts so that movement of said cam engaging means by said cam operates said linkage.

2. A tailgate operating mechanism as defined in claim 1 in which the section having said cam is connected to the truck frame and the section having the cam engaging means is mounted on the bed.

3. A tailgate operating mechanism as defined in claim 1 in which the section having said cam includes a guide roller to move the cam engaging means to cause positive movement of said cam engaging means as the truck bed is raised.

4. A tailgate operating mechanism for a truck as defined in claim 1 in which said linkage includes a lever connected to the end of the respective shaft and a rod moved generally longitudinally for releasing and latching the tailgate.

5. A tailgate operating mechanism for a truck as defined in claim 1 in which said force transmission means consists of a pulley mounted on each shaft and a cable interconnecting said pulleys.

6. A tailgate operating mechanism as defined in claim 5 in which a disengageable clutch connects said force transmission means to the shaft to which said linkage is connected.

7. A tailgate operating mechanism as defined in claim 6 in which a manually operated means is connected to the shaft having said clutch.

8. A tailgate operating mechanism as defined in claim 7 in which the section having said cam includes a guide roller to move the cam engaging means to cause positive movement of said cam engaging means as the truck bed is raised.